(12) United States Patent
Kozhaya et al.

(10) Patent No.: US 11,170,044 B2
(45) Date of Patent: Nov. 9, 2021

(54) PERSONALIZED VIDEO AND MEMORIES CREATION BASED ON ENRICHED IMAGES

(71) Applicant: International Business Machines Corporation, Armonk, NY (US)

(72) Inventors: Joseph Kozhaya, Morrisville, NC (US); Shikhar Kwatra, Durham, NC (US); Andrew R. Freed, Cary, NC (US); Corville O. Allen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 16/238,484

(22) Filed: Jan. 2, 2019

(65) Prior Publication Data

US 2020/0210476 A1 Jul. 2, 2020

(51) Int. Cl.
*G06F 16/78* (2019.01)
*G06F 16/71* (2019.01)
*G06F 16/738* (2019.01)

(52) U.S. Cl.
CPC .......... *G06F 16/7867* (2019.01); *G06F 16/71* (2019.01); *G06F 16/738* (2019.01)

(58) Field of Classification Search
None
See application file for complete search history.

(56) References Cited

U.S. PATENT DOCUMENTS

| | | | |
|---|---|---|---|
| 6,751,776 B1 | 6/2004 | Gong | |
| 6,961,463 B1 * | 11/2005 | Loui | G06T 7/20 382/170 |
| 8,184,142 B2 | 5/2012 | Harel et al. | |
| 8,923,551 B1 | 12/2014 | Groz et al. | |
| 8,934,717 B2 | 1/2015 | Newell et al. | |
| 9,026,915 B1 | 5/2015 | Ehlen et al. | |
| 9,710,461 B2 | 7/2017 | Smith et al. | |
| 2006/0092281 A1 * | 5/2006 | Herley | H04N 21/23424 348/207.99 |
| 2006/0132482 A1 * | 6/2006 | Oh | G06T 3/0012 345/419 |
| 2006/0251339 A1 * | 11/2006 | Gokturk | G06K 9/46 382/305 |
| 2007/0081744 A1 * | 4/2007 | Gokturk | G06K 9/00375 382/305 |
| 2008/0304808 A1 | 12/2008 | Newell et al. | |

(Continued)

FOREIGN PATENT DOCUMENTS

WO WO-2011159946 A1 * 12/2011 ............. G06F 16/14

OTHER PUBLICATIONS

Choi, J. et al., Contextually Customized Video Summaries via Natural Language. In Applications of Computer Vision (WACV), Mar. 2018, 2018 IEEE Winter Conference on (pp. 1718-1726). IEEE.

(Continued)

*Primary Examiner* — Irene Baker
(74) *Attorney, Agent, or Firm* — Will Stock; Otterstedt, Wallace & Kammer, LLP (57) ABSTRACT

A method for creating content includes making a corpus of images available, adding a plurality of tag data to each of the images, receiving a query, extracting a trigger from the query, identifying a set of the images in the corpus, wherein identified images have tag data matching the extracted trigger, and creating a video comprising the identified images.

13 Claims, 4 Drawing Sheets

(56) References Cited

U.S. PATENT DOCUMENTS

| | | |
|---|---|---|
| 2010/0050083 A1 | 2/2010 | Axen et al. |
| 2011/0044549 A1* | 2/2011 | Bressan .............. G11B 27/034 |
| | | 382/225 |
| 2011/0205399 A1* | 8/2011 | Gao .................. G06T 11/60 |
| | | 348/231.99 |
| 2014/0023348 A1* | 1/2014 | O'Kelly .............. G11B 27/031 |
| | | 386/278 |
| 2015/0019203 A1 | 1/2015 | Smith et al. |
| 2015/0193383 A1 | 7/2015 | Rao et al. |
| 2016/0119536 A1* | 4/2016 | Carceroni .......... H04N 5/23245 |
| | | 348/207.1 |
| 2017/0366697 A1* | 12/2017 | Shih .................. H04N 1/00408 |
| 2018/0068019 A1* | 3/2018 | Novikoff ............ G06F 16/783 |
| 2019/0095463 A1* | 3/2019 | Moussaffi ........... G06F 16/583 |

OTHER PUBLICATIONS

Lally; A et al., Question analysis: How Watson reads a clue, IBM J. Res. & Dev. vol. 56 No. 3/4 Paper 2, May/Jul. 2012, pp. 1-14.

* cited by examiner

PERSONALIZED VIDEO AND MEMORIES CREATION BASED ON ENRICHED IMAGES

BACKGROUND

The present disclosure relates generally to content generation, and more particularly to the creation of content using enriched images.

Digital images are pervasive, and many people capture thousands of images either to share special moments with friends and family on social media or to preserve a record of memories. The challenge is that this results in a large number of images which get saved and use up storage space without ever being of value to the consumer unless they spend tedious hours cleaning up the images and sharing as needed.

There has also been a great interest among consumers to bring these images to life by capturing a few seconds before/after the image to provide a "liveliness" aspect to the image or by allowing consumers to build slideshows from the images. These features are well received by consumers, but they are limited in capabilities and still require tedious effort to build slideshows.

SUMMARY

According to some embodiments, a method for creating content includes making a corpus of images available, adding a plurality of tag data to each of the images, receiving a query, extracting a trigger from the query, identifying a set of the images in the corpus, wherein identified images have tag data matching the extracted trigger, and creating a video comprising the identified images.

According to one or more embodiments of the present invention, the method for creating content includes providing a non-transitory computer readable medium comprising computer executable instructions which when executed by a computer cause the computer to perform the method for creating content.

According to an exemplary embodiment of the present invention, a database system includes a database storing a corpus of images, a database storing a plurality of indexes, wherein each index includes references to one or more of the images, and wherein each index corresponds to one class of tag data used in enriching the images, and a processor configured to receive and parse a query, wherein the processor is further configured to select ones of the indexes for processing the query based on the pars of the query, wherein less than all of the indexes are selected.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:

improved automatic creation of theme-specific videos;
improved image selected; and
reducing storage costs by deleting images of little value.

These and other features and advantages of the present invention will become apparent from the following detailed description of illustrative embodiments thereof, which is to be read in connection with the accompanying drawings.

BRIEF DESCRIPTION OF THE DRAWINGS

Preferred embodiments of the present invention will be described below in more detail, with reference to the accompanying drawings.

DETAILED DESCRIPTION

Embodiments of the present invention are directed to a computer software application and method for improved image enrichment and selection for composing a video given a natural language query.

No conventional techniques are believed to build movies from images in a personalized or contextual manner. Rather, conventional methods allow users to select images for inclusion in a slideshow or movie. These slideshows or movies can be based on a particular item in the image, however no known technique exists to generate a video segment based on personalized natural language set of themes.

In some embodiments, a video composing system as referenced herein comprises software components such as, but not limited to, computer-executable instructions, data access objects, service components, user interface components, application programming interface (API) components; hardware components such as electrical circuitry, processors, and memory; and/or a combination thereof. The memory may be volatile memory or non-volatile memory that stores data and computer executable instructions. The computer-executable instructions may be in any form including, but not limited to, machine code, assembly code, and high-level programming code written in any programming language. The video composing system may be configured to use the data to execute one or more instructions to perform one or more tasks.

Figure 1:
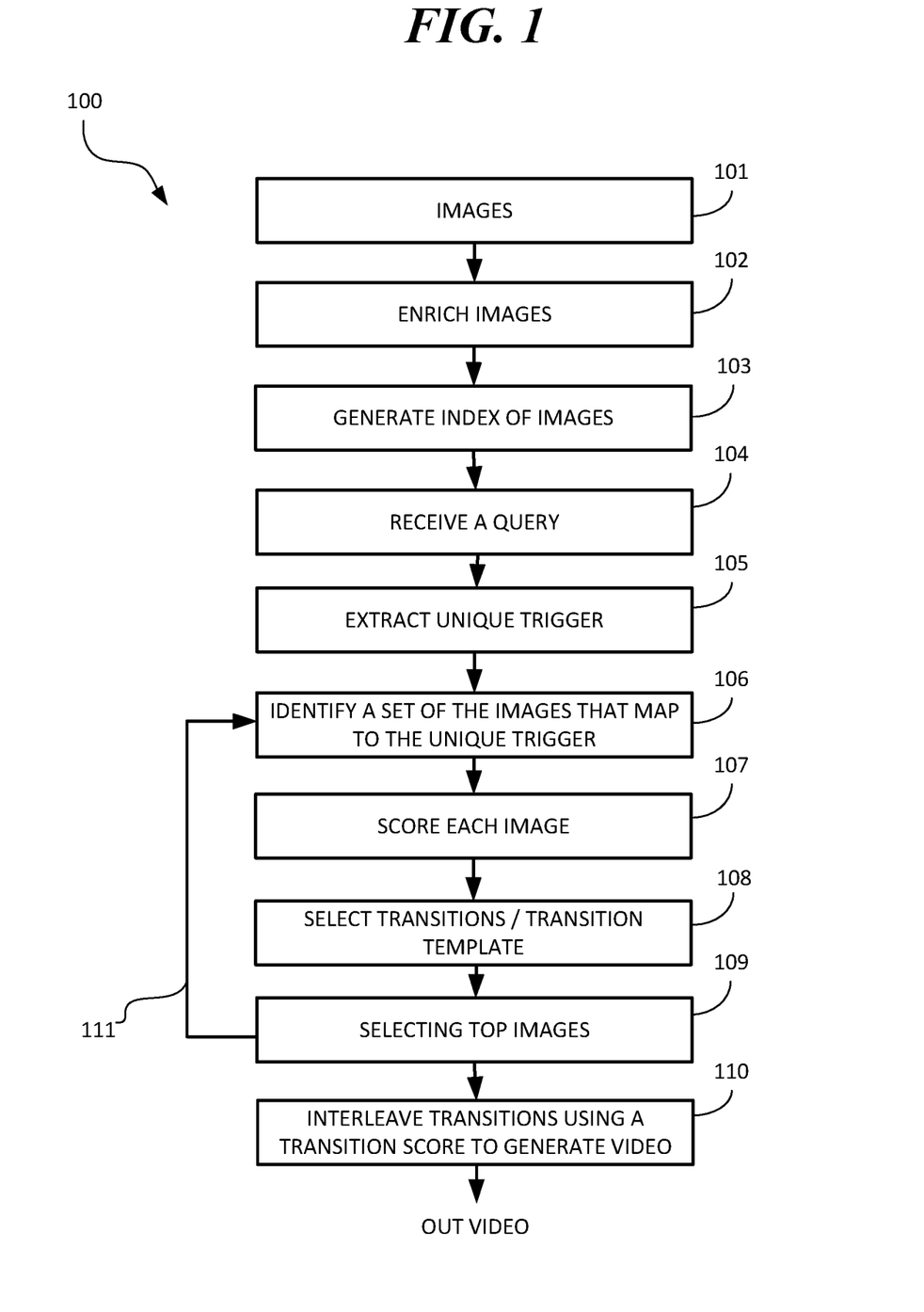
FIG. 1 is a flow diagram of method for creation of content using enriched images according to an exemplary embodiment of the present invention.

Referring to FIG. 1, in a method 100 executed by a video composing system executing the computer software application according to an exemplary embodiment of the present invention, a corpus of images (e.g., stored in a user's mobile device, in a cloud image storage service, on a social media platform, etc.) is provided and/or made accessible 101. Each of the images in the corpus is associated with tag data including metadata and/or enrichments 102. The tag data can be internal data or external data. Internal data is embedded in the image. External data is stored outside of an image file and can be handled by a digital asset management system.

According to one or more embodiments of the present invention, images are automatically tagged with enrichments and metadata describing parameters (e.g., location, date, time data, etc.) and content (e.g., object names, names of people, etc.) of the images. Tag data can be added to images at various times, including at a time of image capture by the user's mobile device, at a time of storage to a database containing a corpus of previously captured images, or at another time. Accordingly, this tag data provides a record that is associated with each image.

At block 102, the images are enriched by one or more existing techniques to associate additional information with the images. In one embodiment, these techniques include artificial intelligence techniques to extract objects in images or classify images. In another embodiment, these techniques leverage crowd sourcing to identify objects in images or classify images. For example, an image can be enriched with information about people and locations appearing in an image, and/or additional indications of times (e.g., an indication of an event).

In some embodiments, a visual recognition method is applied to extract data about things (e.g., objects, animals, descriptions of scenes, etc.) in the images. The extracted data can be stored as tag data at block 102. An example of the visual recognition method includes Watson Visual Recognition, which is an application program interface (API) service available on the IBM Cloud, which uses Deep Learning Convolutional Neural Networks (CNNs) to classify images.

As described herein, tag data includes enrichments and metadata, which can be used for similar purposes. In one or more embodiments, the sources of enrichments and metadata are different. For example, in some embodiments metadata indicates information about an image that is captured automatically, including location and date, and enrichments are extracted from the images, for example, using visual recognition. Exemplary image enrichments include, people in the image, time/date of the image, text extracted from the image, scenes in the image, etc. Visual recognition artificial intelligence (AI) services, such as, the Watson Visual Recognition service, can be used to create/extract enrichments and metadata from images.

At block 103, tag data is used to create one or more indexes of the images. In some embodiments, the techniques run against the images extract the tag data and organize the images according to the tag data.

In some embodiments, identifying high-value images that contribute to a user-specified story-line can be performed efficiently given multiple indexes generated for the corpus of images. For example, each index is optimized to search against one or more of the enrichments and metadata. More particularly, each index is optimized to search against one class of enrichments, for example, one of time, date, location, people, events, etc. Later, when a user query is received and parsed, relevant indexes are identified and used to retrieve images.

According to one or more embodiments of the present invention, the indexes enable the corpus of images to be stored in an efficient and inexpensive storage system, such as an object-storage system (e.g., Cloud Object Storage), and information about the images (i.e., the indexes) including a reference to the image and the metadata and the enrichments to be stored in a high-performance database (e.g., a non-relational, distributed database), such as Cloudant. In some embodiments, multiple indexes can be created against the database of images to enable efficient retrieval of images that best capture the user-specified story-line.

In some embodiments, the computer system receives a query at block 104. The query can be in the form of a natural language query, a user selection of a story line or theme, etc. For example, the user requests a video about a "Trip to Italy in 2015" or "Pictures of Nicolas in elementary and middle school." Accordingly, the query provides the computer system with clues about a desired story-line or theme to be used in generating a video. According to one or more embodiments, the query can be input through a text box, through speech, selecting from a list of pre-determined themes, and the like. In a general case, the user inputs the query (e.g., into a text box) "show me a video of our trip to Italy in 2016." In some embodiments, the method will execute upon receiving the query, parsing the query (e.g., to identify instances of tag data) and searching the corpus for images associated with identified instances of the tag data.

It should be understood that the parsing can be performed using existing methods for receiving an unstructured text query and identifying syntactic and semantic elements of the query, which are encoded as structured information that is later used by the other components of the video composing system. For example, a video composing system according to an embodiments of the present invention can use conventional question-answering methods to represent queries as graphs either of syntactic relations in a parse or PAS, or as deep semantic relations in an ontology.

In some embodiments, if the user provides the query via speech, the speech is converted into text and then the method executes. In another embodiment, a set of themes (or story lines) are extracted as images are added to a corpus, these themes forming a pre-determined, selectable, set of themes (for example, where an index of images of boats or ships is created and maintained).

At block 105, given the query providing hints about a desired a story line, a unique trigger in the query is extracted. The unique trigger is similar to a focus, or the part of the query that is a reference to an answer or theme. In some embodiments the unique trigger or focus is used to align the query with tag data of potential matching images. The unique trigger can be, for example, a person, location or date.

According to at least one exemplary embodiment, the extraction of the unique trigger includes applying a natural language processor (NLP) model to extract triggers directly from the query or story line input by the user. Embodiments of the present invention leverage natural language processing techniques to extract unique triggers from the input natural language query. Such unique triggers can be in the form of named entities, keywords, or concepts referenced in the natural language query from the user.

Existing solutions and services can take input natural language text and extract entities, keywords, and concepts from that text, including for example, the Watson Natural Language Understanding service delivered through the IBM Cloud. The natural language understanding service can be customized to extract unique entities to a certain field of interest. For example, if the user inputs "show me a video of our trip to Italy in 2016," the Watson NLU service extracts "Italy" as location and "2016" as the date.

According to one or more exemplary embodiments, a theme or story line is provided in natural language in a query, and relevant images are identified from a corpus of images using the enrichments and a video is composed based on the provided theme. Exemplary queries/themes include: "Pictures of Nicolas in elementary and middle school years," "Memories from Cruise 2017," "Trip to Italy in 2015," "John's birthdays," etc. As described above, a user can provide a theme (e.g., by selecting from a set of pre-determined themes, by natural language query, etc.). In at least one other embodiment, a computer system automatically identifies a relevant theme given a set of user selected images; that is, the query can take the form of a set of seed images, and a focus of the seed images is determined from the tag data. In some embodiments these images are a selected subset of images.

At block 106, the method includes identifying a set of the images that best maps to the unique triggers. For example, the method finds all images associated with "Nicolas" and all images with elementary and middle school tags. In some embodiments, the creation of a video from the corpus of images based on a given story-line includes identifying high-value images that contribute to multiple themes using the tag data associated with the images. According to at least one exemplary embodiment, the creation of a video from the corpus of images is based on a given story-line and includes scoring each image for appropriateness to a theme or transition within a theme.

At block 106, in some embodiments the identification of the set of the images that best maps to the unique triggers includes building the image set up with tagged or pre-determined (e.g., pre-canned) entities. For example, in a case where only a few images are identified that match some parameter of the query/theme, additional sources of images can be accessed. For example, the system can add images from another source that are determined to be relevant based on their own tag data. For example, in a case where a query specifies a certain city and the user's corpus of images does not include an image with tag data relevant to a popular attraction in that city, an image of the attraction can be added to the set of identified images.

Assuming that N total images are found at block 106 (where N is a positive integer), the method determines a score for each of the images at block 107 based on the tag data. In one embodiment, each image is assigned a score between 0 and 1 with 1 being the most relevant score. In some embodiments, the score is determined based on a number of enrichments matching the extracted trigger and/or how relevant one or more enrichments are to the extracted trigger. According to one or more embodiments of the present invention, the score is computed as a weighted average of multiple parameters determined based on how the tag data matches the theme. For example, if the query specifies a year, and tag data for a certain image includes that year, then a match is determined. In some embodiments these parameters reflect how well the image captures the story line trigger, how unique the image is in capturing the trigger (e.g., is it the only image that captures Nicolas in elementary school?), how much information the image provides (e.g., does the image represent multiple objects?), and/or a quality of the image (e.g., how good is the image's resolution, is the image in bright light, etc.). In one embodiment, the weights for the different parameters can be equal. In another embodiment, the weight for the parameters representing how well the image captures the story line trigger can be set higher than the weight for the parameter representing the quality of the image. These weights can be configurable with default values that work well in general.

At block 108, the method includes choosing transitions between the identified images. In some embodiments, transitions are associated with tag data and are selected from pre-defined templates (for example, applying certain transitions when sequential images change from one state to another). In some embodiments, the tag data of the templates is associated with themes (e.g., a cruise theme, an education theme, a super-hero theme, etc.) that can be matched to an image or a cluster of images. According to at least one exemplary embodiment, natural language enrichments are used to cluster images, and transitions are used to interleave the clusters (from one cluster to the next). Using a cruise theme as an example, a first group images is identified as capturing scenes at port(s), a second group of images is identified as capturing scenes at sea, a third group of images is identified as capturing scenes at beach(es), a fourth group of images is identified capturing dining scenes (e.g., using natural language enrichments associated with the images), and one or more transitions are interleaved between each cluster (e.g., from the cluster of images of port to the cluster of images of sea). According to at least one embodiment, if a temporal transition is specified or deduced in the natural language theme, use the default theme for creating the storyline and transitions in a sequential fashion. For example, if the natural language theme specifies "show me a video of Nicolas in elementary and middle school," then the identified images would be sorted in time and then transition is done sequentially which is a natural representation of a video of images that progress in time.

According to one or more embodiments of the present invention, the transition score is an improvement over randomly slotting the images, wherein the transition score is used to ensure coherence. Transition elements include, for example, time (e.g., with a preference for displaying pictures in time order), geospatial (e.g., with a preference for displaying pictures in geospatial order—for example, along a route between two points), and topic (e.g., with related pictures grouped together—for example, displaying images associated with schools then displaying images associated with athletics).

According to one or more embodiments of the present invention, the transition template provides pre-define image layouts for use in composing the video. For example, a time-based transition template can be used to generate a video containing one image per year, or a video including images selected from a first time period followed by images selected from a second time period, followed by images captured during a third time period. Another example of a transition template includes a location-based template used to generate a video including one image per X number of miles traveled.

At block 109, the method includes selecting a top K images (were K<N) using the score determined in block 107, and for each image k in (1 ... K), deciding how to transition from k to k+1 based on a transition score 110. In some embodiments the number K is predefined, for example, within the computer software application. In another embodiments, K is determined from the query (e.g., the query may request a video of K images showing Nicolas from the previous 10 years). It should be understood that the number of images K can be determined using other methods and that the exemplary embodiments described herein are not intended to be limiting. According to one or more embodiments of the present invention, the transition score is computed based on similarity of associated metadata tags of two or more of the images, where an (initial) sequence of the K images is determined using the tag data (for example, the images are to be displayed in a temporal sequence or based on geography). In some embodiments, if image k has five metadata tags and image k+1 has eleven metadata tags, and images k and k+1 have four common metadata tags, then the transition score can be computed as the ratio of the common metadata tags (in this example, four) to the number of total unique metadata tags (in this example, twelve). Note that the transition score is different from the image score. In some embodiments, if the transition score>threshold, then the images are applied in a sequence.

In some embodiments, if the transition score<threshold, then the method (111) identifies an intermediary image in between images k and k+1. For example, the intermediary image is selected from the remaining N-K images (e.g., returning to block 106 and identifying additional images— with different parameters—that map to the unique triggers), or the intermediary image(s) are selected from another cluster of images specifically suited for transitionary frames. Following this example, in a case where the intermediary image is selected from another cluster, if image k is of Nicolas in elementary school and image k+1 is Nicolas in middle school, a transitionary set of images is selected showing a subject going from elementary to middle schools depending on aging process and trendline for inserting between image k and image k+1. In some embodiments, these intermediary images are selected from an external database (e.g., an available image database) on the basis of their tag data (e.g., using a similarity to the images selected from the corpus and based on the trigger extracted from the query).

At block 109, in a case where the corpus of images includes one image of a given subject in first grade and one image of the subject in fifth grade, then that transition score will likely be small and in that case, the method will show the first image of the subject in first grade followed by images of another (e.g., random) subject (or subjects) in first grade, second grade, third grade, and so on, and ending with the image of the subject in fifth grade. In another example, given images taken on a cruise ship, an initial image captures a scene at port and concludes with an images at a beach. The transition score is likely low between the initial and concluding images such that additional images, e.g., of a cruise ship at port, at sea and then at the beach, are inserted.

According to one or more exemplary embodiments, the method of FIG. 1 can be applied with different transition templates and different subset of images, and presented to the user for validation (e.g., before display or publishing the video to a content sharing system).

The following are examples data schemas according to some embodiments of the present invention:
Schema Table 1 (Metadata):
  a. Image ID (actual image could be stored in Object Storage)
  b. Time: time image was captured
  c. Location: GPS coordinates where image was captured
  d. Date: date when image was captured
Schema Table 2 (Enrichments):
  a. Image ID
  b. People: List of people in the image
  c. Locations: List of locations pictured in the image
  d. Times/Dates/Seasons/Periods: what can be extracted from the image (e.g., adolescence, elementary school years, middle school years, high school . . . college years . . . spring, summer, fall, winter, . . . )
Schema Table 3 (Objects);
  a. Image ID
  b. Objects in image mapped to a specific taxonomy
  c. Objects in image mapped to another taxonomy
  d. Multiple levels of objects in image mapped to multiple relevant taxonomies Referring to FIG. 2, an exemplary video composing system 200 includes a database of images 201 and a database of indexes 202, where each of the indexes is associated with a class of enrichments or metadata. The indexes 202 include references to one or more of the images 201.

Figure 2:
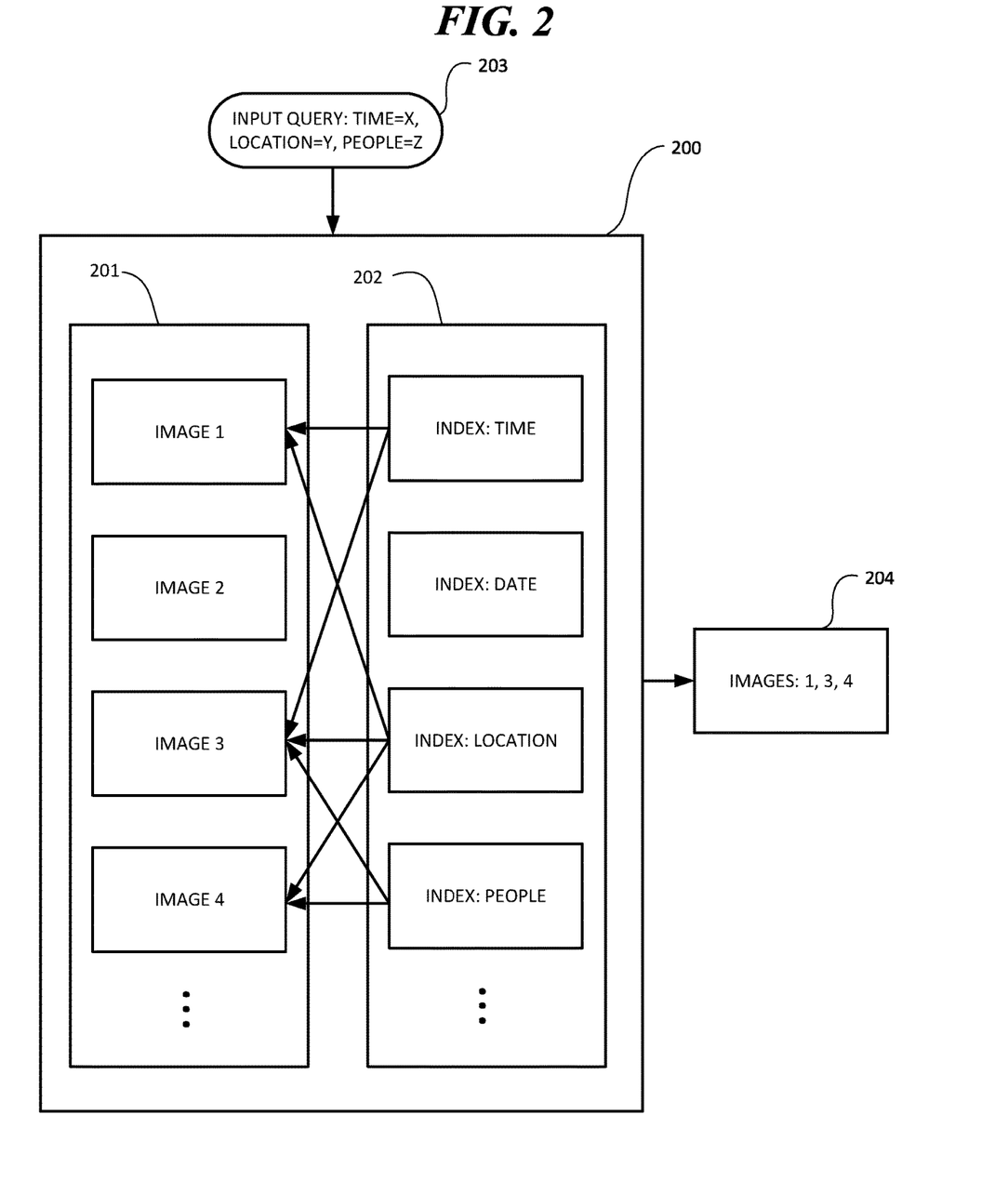
FIG. 2 is a diagram of an exemplary computer system and database structure according to an exemplary embodiment of the present invention.

The video composing system 200 including the image database 201 and the index database 202 receives a query 203 referencing (e.g., in natural language) a time, location and person to be searched for. The video composing system 200 selects the "time" index, "location" index and "people" index, using the selected indexes to efficiently search for relevant images from the image database 201. The video composing system 200 uses the selected indexes to determine a set of relevant images 204.

It should be understood that specific instances of the classes of indexes can be determined from the query 203. For example, the query 203 may ask for images of "Katie" taken in "New York" around "noon." The computer system parses the query, identifying the relevant indexes of time, location and people before searching the database of image 201. In an exemplary case, image 2 does not include enrichments in the relevant classes and therefore is not searched for the specific instances. Thus, the index structure is an efficient means of searching the image database.

According to at least one exemplary embodiment, storage space is reclaimed by deleting non-unique images or value-adding images, thereby reducing clutter. For example, as shown in the method 300 of FIG. 3, in some embodiments, images in the corpus of periodically reviewed 301 to evaluate their usefulness in serving user queries. In one embodiment, the period of review is one week and, in another embodiment, the period of review is one month. It should be understood that other periods can be implemented. According to one exemplary embodiment, the review of the images includes identifying how many times the images were used in serving user queries (e.g., during a previous period, averaged over some number of previous periods, etc.). In the present example, a subset of the images is identified 302 which have never been used in serving user queries in some previous period of time. At block 302, other thresholds (i.e., other than zero uses) for use can be used. For example, images having been used in serving user queries less than five times in the previous period of time can be added to the subset of images. In some embodiments, prior usage of an image is recorded in the image's metadata. At block 303, the subset of images is added to a set of images $I_{notused}$. All images that were used in addressing a user query (or images that were used more than the threshold number of time) are added to a set of images $I_{used}$ 304. Each image in subset $I_{notused}$ is compared to the images in set $I_{used}$ 305. In one embodiment, comparing the images can be performed using artificial intelligence capabilities to determine similarity of images. If image i in $I_{notused}$ is found to be similar to one or more images in $I_{used}$, then image i is deleted or archived 306. If, on the other hand, image i is not similar to any image in $I_{used}$, then image i is preserved 307. In another embodiment, comparing the images can be performed by comparing one or more of the enrichments and tags of the images. For example, if image i in $I_{notused}$ has a number of enrichments which are all covered by one or more images in $I_{used}$, then image i is deleted or archived 306; otherwise, image i is preserved 307.

Figure 3:
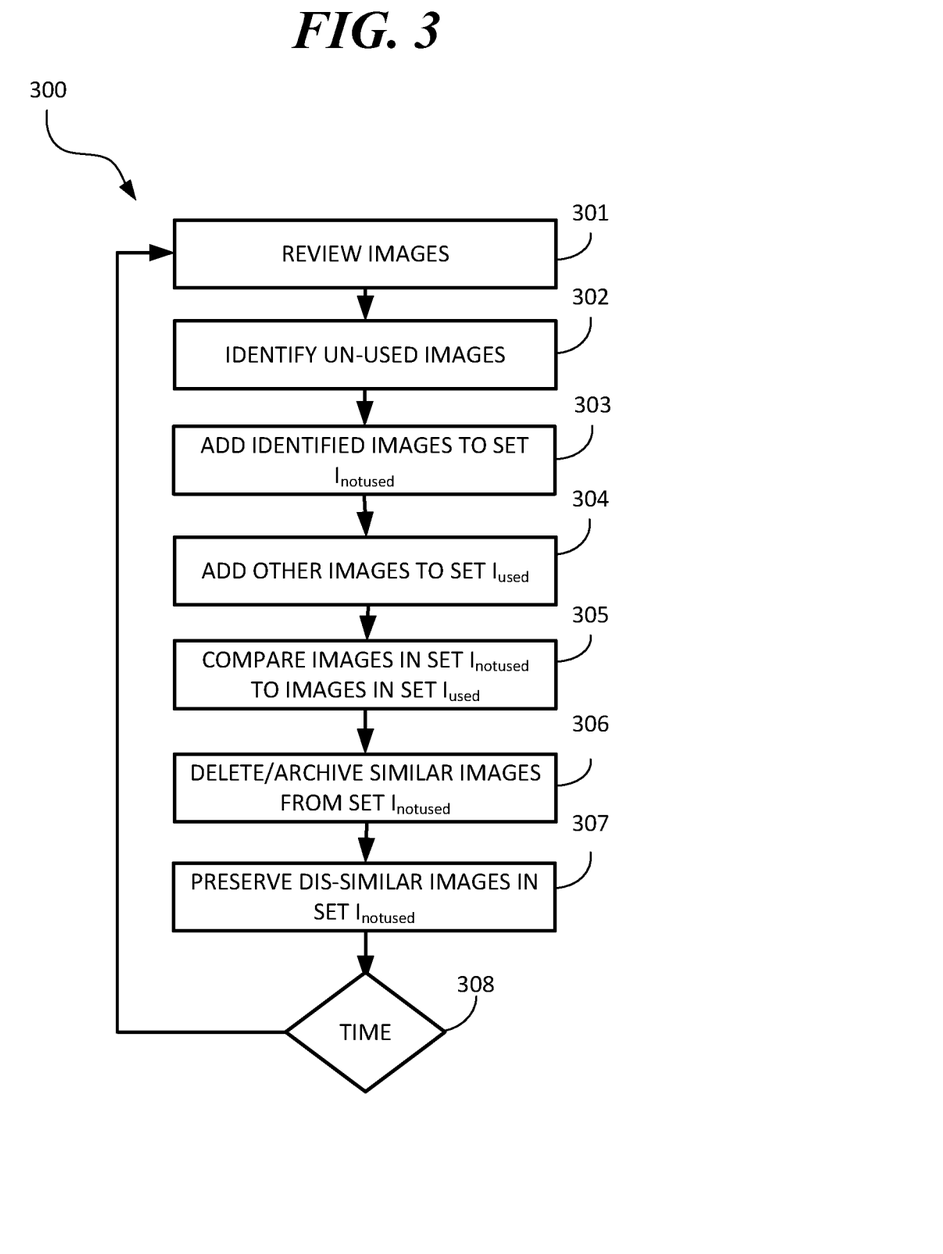
FIG. 3 is a flow diagram of a method of reducing storage resource consumption according to one or more embodiments of the present invention.

As shown in FIG. 3, images that are not used (or are seldom used) to serve a user query are evaluated periodically 308 to see if all the information they offer is covered by other images and if so, they are deleted or archived (e.g., using digital compression), freeing storage space. Thus, images with a low value are deleted to archived.

Recapitulation:

According to some embodiments, a method for creating content includes making a corpus of images available 101, adding a plurality of tag data to each of the images 102, receiving a query 104, extracting a trigger from the query 105, identifying a set of the images in the corpus 106, wherein identified images have tag data matching the extracted trigger, and creating a video comprising the identified images 110.

According to one or more embodiments of the present invention, the method for creating content includes providing a non-transitory computer readable medium comprising computer executable instructions which when executed by a computer cause the computer to perform the method for creating content.

According to an exemplary embodiment of the present invention, a database system 200 includes a database storing a corpus of images 201, a database storing a plurality of indexes 202, wherein each index includes references to one or more of the images, and wherein each index corresponds to one class of tag data used in enriching the images, and a processor 16 configured to receive and parse a query, wherein the processor is further configured to select ones of the indexes for processing the query based on the pars of the query, wherein less than all of the indexes are selected.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for creation of content using enriched images. Further, a computer program product can include a tangible computer-readable recordable storage medium with code adapted to be executed to carry out one or more method steps described herein, including the provision of the system with the distinct software modules.

Figure 4:
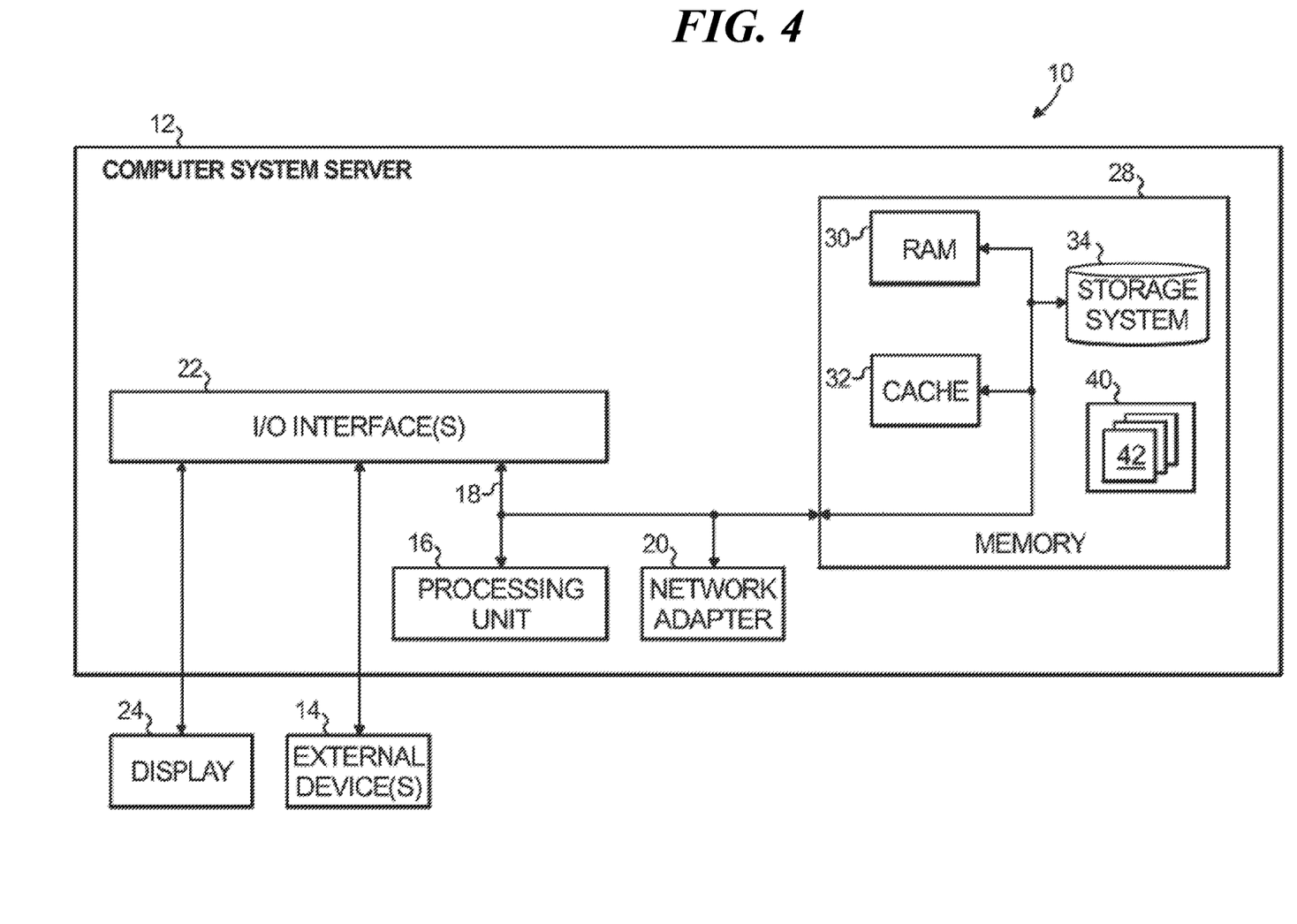
FIG. 4 is a block diagram depicting an exemplary computer system embodying a method for creation of content using enriched images according to an exemplary embodiment of the present invention.

One or more embodiments of the invention, or elements thereof, can be implemented in the form of an apparatus including a memory and at least one processor that is coupled to the memory and operative to perform exemplary method steps. FIG. 4 depicts a computer system that may be useful in implementing one or more aspects and/or elements of the invention, also representative of a cloud computing node according to an embodiment of the present invention. Referring now to FIG. 4, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 4, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 4) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for creating content comprising:
receiving a natural language query;
extracting a trigger from the natural language query;
identifying a set of images in a corpus of images in which tag data is associated with each of the images, wherein the tag data of identified images matches the extracted trigger;
scoring each of the identified images as a weighted average of multiple parameters determined based on how the tag data of each of the identified images matches the trigger;
selecting a set of the identified images for inclusion in a video using the scoring, wherein less than all of the identified images are used in creating the video;
determining an initial sequence for the set of the identified images;
determining a transition score between two adjacent images in the sequence as a ratio of a number of common tags to a number of total unique metadata tags associated with the two adjacent images;
comparing the transition score determined between the two adjacent images in the sequence to a threshold, wherein the threshold is a bound on coherence between any two adjacent images in the sequence, the coherence is defined by a measure of common tag data, and the comparison to the threshold results in a determination that the two adjacent images are insufficiently coherent;
identifying at least one intermediary image for insertion into the sequence between the two adjacent images based on respective similarities determined between the at least one intermediary image and each of the two adjacent images; and
creating the video comprising the set of the identified images having the initial sequence modified by an insertion of the at least one intermediary image into the sequence between the two adjacent images.

2. The method of claim 1, wherein a coherence of the at least one intermediary image identified for insertion into the sequence is checked, using the threshold, in combination with each of the two adjacent images.

3. The method of claim 1, further comprising generating an index of the images in the corpus, wherein the index includes information about the tag data.

4. The method of claim 3, further comprising processing the query against the index to identify the set of images in the corpus.

5. The method of claim 1, further comprising generating an index of the images for each of a plurality of classes of the tag data.

6. The method of claim 5, further comprising processing the query against the indexes to identify the set of images in the corpus, wherein the processing is applied against less than all of the indexes based on the query.

7. The method of claim 1, further comprising maintaining a database storing the corpus of images, wherein the maintenance comprises:
maintaining, for each image, a record of prior usage in metadata of the respective images;
identifying, using the record of prior usage, unused images in the corpus of images;
comparing the unused images to other images in the corpus to determine a similarity value of each of the unused images determined based on a similarity to images in a set of used images in the corpus of images; and
deleting, from the database, images of the unused images determined to be similar to at least one of the images of the set of used images based on the similarity value.

8. The method of claim 1, further comprising maintaining a database storing the corpus of images, wherein the maintenance comprises:
maintaining, for each image, a record of prior usage in metadata of the respective images;
identifying, using the record of prior usage, unused images in the corpus of images;
comparing the unused images to other images in the corpus to determine a similarity value of each of the unused images determined based on a similarity to images in a set of used images in the corpus of images; and
archiving images of the unused images determined to be similar to at least one of the images of the set of used images based on the similarity value.

9. In a general purpose computer, a method for creating content, the method comprising:
accessing a corpus of images available, wherein each of the images is associated with tag data;
generating a different index for each of a plurality of classes of the tag data, wherein each of the indexes includes references to a set of relevant images selected from the corpus of images according to the tag data;
receiving a natural language query;
extracting a trigger and a preference from the natural language query;
identifying, by determining respective matches of the trigger to the classes of tag data, at least one, and less than all, of the indexes;
processing the images of the identified indexes to identify a set of images, wherein the processing comprises scoring each of the images of the identified indexes as a weighted average of multiple parameters determined based on how the tag data of each of the images of the identified indexes matches the trigger;
determining an initial sequence for the identified set of images according to the preference;
determining a transition score between two adjacent images in the sequence as a ratio of a number of common tags to a number of total unique metadata tags associated with the two adjacent images;
comparing the transition score determined between the two adjacent images in the sequence to a threshold, wherein the threshold is a bound on coherence between any two adjacent images in the sequence, the coherence is defined by a measure of common tag data, and the comparison to the threshold results in a determination that the two adjacent images are insufficiently coherent;
identifying at least one intermediary image for insertion into the sequence between the two adjacent images based on respective similarities determined between the at least one intermediary image and each of the two adjacent images; and
creating a video comprising the identified images ordered according to the sequence and including the at least one intermediary image inserted into the sequence between the two adjacent images.

10. The method of claim 9, further comprising:
scoring each image of the identified set of images using the tag data; and
selecting a set of the identified images for inclusion in the video using the scoring, wherein less than all of the identified images are used in creating the video.

11. The method of claim 9, further comprising providing a non-transitory computer readable medium comprising computer executable instructions which when executed by a computer cause the computer to perform the method for creating content.

12. The method of claim 9, further comprising maintaining a database storing the corpus of images, wherein the maintenance comprises:
maintaining, for each image, a record of prior usage in metadata of the respective images;
identifying, using the record of prior usage, unused images in the corpus of images;
comparing the unused images to other images in the corpus to determine a similarity value of each of the unused images determined based on a similarity to images in a set of used images in the corpus of images; and
deleting images of the unused images determined to be similar to at least one of the images of the set of used images based on the similarity value.

13. The method of claim 9, further comprising maintaining a database storing the corpus of images, wherein the maintenance comprises:
maintaining, for each image, a record of prior usage in metadata of the respective images;
identifying, using the record of prior usage, unused images in the corpus of images;
comparing the unused images to other images in the corpus to determine a similarity value of each of the unused images determined based on a similarity to images in a set of used images in the corpus of images; and
archiving images of the unused images determined to be similar to at least one of the images of the set of used images based on the similarity value.

* * * * *